United States Patent
Jullien

(10) Patent No.: US 7,780,145 B2
(45) Date of Patent: Aug. 24, 2010

(54) LOAD COMPENSATING DEVICE, ESPECIALLY FOR LIFTING APPLIANCE

(75) Inventor: Michel Jullien, Lucenay (FR)

(73) Assignee: Reel, St. Cyr au Mont d'Or (FR)

( * ) Notice: Subject to any disclaimer, the term of this patent is extended or adjusted under 35 U.S.C. 154(b) by 525 days.

(21) Appl. No.: 11/733,373

(22) Filed: Apr. 10, 2007

(65) Prior Publication Data
US 2007/0274427 A1 Nov. 29, 2007

(30) Foreign Application Priority Data
Apr. 25, 2006 (FR) .................................. 06 51462

(51) Int. Cl.
*B66D 1/00* (2006.01)
(52) U.S. Cl. .................. 254/277; 254/275; 376/258
(58) Field of Classification Search ................ 254/275, 254/277; 212/149, 156, 195; 376/245, 260, 376/258, 268
See application file for complete search history.

(56) References Cited

U.S. PATENT DOCUMENTS

| | | | |
|---|---|---|---|
| 3,035,712 A * | 5/1962 | Nowack | 212/278 |
| 3,896,938 A * | 7/1975 | Eich et al. | 212/279 |
| 4,487,741 A * | 12/1984 | Vuckovich et al. | 376/271 |
| 4,597,497 A * | 7/1986 | Aberegg | 212/274 |
| 4,734,251 A * | 3/1988 | Blum | 376/261 |
| 4,886,174 A | 12/1989 | Leveugle | |
| 4,894,849 A * | 1/1990 | Rohosky et al. | 376/268 |
| 6,068,240 A | 5/2000 | Leveugle | |
| 2007/0137535 A1 * | 6/2007 | Jones et al. | 108/147 |

FOREIGN PATENT DOCUMENTS

| | | |
|---|---|---|
| EP | 0 292 413 | 11/1988 |
| EP | 1 028 084 | 8/2000 |
| FR | 2 753 188 | 3/1998 |

* cited by examiner

*Primary Examiner*—Emmanuel M Marcelo
(74) *Attorney, Agent, or Firm*—Heslin Rothenberg Farley & Mesiti P.C.

(57) ABSTRACT

A load compensating device, especially one for lifting appliances, includes a detector for detecting an overload or an underload and designed to cause actuation of the compensating device. The device comprises an actuator attached to one of ends of a rope or ropes that support the load for producing positive or negative displacement of the rope or ropes over a short distance compared with the length of the rope or ropes. The actuator is operated by a brushless electric motor connected to an infinitely variable-speed transmission. The transmission is connected to the detector.

5 Claims, 5 Drawing Sheets

LOAD COMPENSATING DEVICE, ESPECIALLY FOR LIFTING APPLIANCE

FIELD OF THE INVENTION

The present invention relates generally to lifting and handling appliances and more especially to a device called a load compensator intended to optimise the operation of such lifting appliances.

More particularly, the invention has applications in the field of nuclear reactors, especially use in power stations for handling nuclear fuel assemblies.

DESCRIPTION OF THE PRIOR ART

The use of a load compensating device is well known in the field of lifting and handling appliances and, more especially, travelling cranes. In this particular context, one of the ends of the hoisting rope or ropes that ensure lifting is wound round the revolving drum of a winch and the other end of said rope or ropes is attached to the lifting trolley of said lifting appliance.

Between these two ends, the rope or ropes are wound around a loose pulley rotatably mounted above the attachment point of the trolley and around a loose pulley of a travelling block with a hook to which the load is attached, for example by means of a gripper.

A load cell associated with means of causing stoppage of rotation of the drum if the rope or ropes are subjected to an overload or, on the other hand, an underload is installed between the loose pulley and the travelling block.

Overloading occurs if, while the load in question is being lifted, it catches on an obstacle whereas underloading occurs if the load comes up against an obstacle while it is being lowered.

In the field of nuclear reactors, the reactor core which consists of a certain number of nuclear fuel assemblies fitted at the level of a diagrid, also referred to as a core grid plate, at the bottom of the reactor vessel, has to be rearranged periodically.

In fact, after a certain operating time, the fuel assemblies in the reactor core, generally speaking the oldest and most irradiated assemblies located substantially in the central area of the core, are removed from the latter and the peripheral assemblies are gradually moved inwards toward the centre of the core. Consequently, new fuel assemblies are located around the periphery.

When the fuel assemblies in question are fresh, they are straight and there is therefore no particular difficulty in handling them or placing them in the core plate.

In contrast, after they have been irradiated for a certain length of time, said fuel assemblies are found to exhibit various types of deformation, in particular twisting, so-called "banana-ing" and bowing, with this deformation tending to increase sharply as the duration or degree of irradiation increases, thereby causing increasing difficulty when placing fuel assemblies in the core or removing them from the latter.

Given the deformation of fuel assemblies thus caused after one or several operating cycle(s), reinserting them into other locations of the core through the core plate can pose problems, especially because of lack of clearance relative to adjacent fuel assemblies.

Traditionally, a reactor core is refuelled from a level which is higher than that of the reactor cavity by using a so-called refuelling machine which is capable of moving above said cavity as when using a travelling crane. One of the major problems which operators of such nuclear power plants are confronted is the relatively long time that it takes to shuffle a reactor core, given the large number of operations that have to be performed.

In fact, it is not uncommon for shuffling or rearranging a reactor core to necessitate shutting down the plant for a period of several weeks; this limits the generation of electricity accordingly and consequently reduces the profitability of such a plant.

The length of time it takes to load and unload the reactor is an inherent part not only of actual manipulation of the fuel assemblies but also of their positioning on the core plate. Because of this, one can readily appreciate the need to have means of lifting and handling that are both efficient and fast and which overcome or reduce the risks of obstruction between fuel assemblies during loading and unloading operations.

The reader is also reminded that, generally speaking, nuclear fuel assembles consist of rods comprising a stack of sintered pellets of the actual fuel, these rods being assembled together by means of spacer grids distributed along the length of the fuel assembly.

In the context of a lifting operation, i.e. removing or reshuffling a fuel assembly, hang-up of the assemblies results in overloading of the lifting appliance and, in particular, the rope or ropes must be detected immediately in order to cause stoppage of the motor of the winch of the refuelling machine.

In fact, if such an overload is not detected or if it takes too long to switch off the motor of the winch, the spacer grids of the fuel assemblies which are entangled are likely to be damaged and there is risk of the cohesion of the actual assembly being adversely affected by this with possible totally unacceptable consequences: release of rods making it necessary to recover them in a highly hostile atmosphere, etc.

The same thing is likely to occur when placing a fuel assembly into a core, apart from the fact that overloading becomes underloading and the tension of the rope or ropes diminishes, making it impossible to position the fuel assembly vertically.

In order to overcome these disadvantages, a load compensator intended to position itself at the level of the trolley of the refuelling machine has been proposed, for example in Document EP-A-0 292 413.

Such a device essentially comprises:

a fixed armature, attached to the trolley, and comprising two end stops;

a sliding block adapted to slide in said armature between said end stops;

an outer bell element provided with means adapted to cooperate with the sliding block;

an overload jack disposed between the sliding block and armature, especially one of the end stops;

an underload jack housed between the sliding block and the outer bell element;

a passive counterweight system consisting of a defined weight making it possible to limit the force applied to the fuel assembly when placing the latter.

The end of the rope or ropes of the lifting appliance is directly or indirectly attached to the outer bell element.

Also, a modulated electro-pneumatic supply circuit for the jacks is provided and acts depending on variations in the load forces detected. These variations are detected by means of a load cell which, depending on a predetermined and preset threshold, causes pressure to be applied to said underload and/or overload jacks respectively in accordance with discrete values.

Optimisation of this device whereby control of the pressure in the respective jacks is continuously controlled has also been proposed in Document FR-A-2 753 188.

Although this device admittedly operates satisfactorily, ongoing research to rationalise the operation of nuclear power stations has resulted in the desire to reduce the duration of reactor core shutdowns and recommendations that load lifting speeds be increased in order to achieve this. Typically, the load lifting speeds required have increased significantly compared with the constraints set out during development of the load compensator described above.

In addition, the actual loads have been modified and have risen with, moreover, variable masses depending on the tools likely to be separately mounted on the loading gripper located at the end of the rope or ropes.

Experience shows that such pneumatically-operated load compensators are unsuitable in use given changes in the dynamic characteristics of the environment in which they are intended to be used and they do not make it possible to take into consideration various thresholds depending on the loads handled.

The object of the present invention is therefore to overcome these disadvantages and to propose a load compensating system that makes it possible to increase the load lifting speeds and masses initially assumed in the context of previous techniques and that consequently makes it possible to specify various thresholds for triggering actuation of said load compensator whilst optimising operating and safety conditions.

FIELD OF THE INVENTION

The invention relates to a load compensating device, especially one for lifting appliances, comprising means suitable for detecting an overload or an underload and designed to cause actuation of said device.

This load compensating device comprises an actuator attached to one of the ends of the rope or ropes that support the load capable of producing positive or negative displacement of said ropes over a short distance compared with the length of the rope or ropes and operates using a brushless electric motor which is itself connected to the means of detecting the overload or underload.

In other words, the invention mainly involves no longer making use of pneumatic means which are unsuitable because of the load lifting speeds that are now imposed, in particular, by operators of nuclear power stations and replacing such means by an electric actuator that has the advantage of offering a short response time and considerable acceleration capacity.

To achieve this, the linear electric actuator comprises a brushless motor, reducing gear and a worm, especially with ball bearings or roller bearings.

According to a first version of the invention, this linear actuator comprises an electric ball screw jack actuated by such a brushless motor.

In another embodiment of the invention, the linear actuator consists of a rotating element of the torque motor type, said motor also being of the brushless type and being associated with reducing gear and a connecting rod in order to obtain the desired translational movement.

BRIEF DESCRIPTION OF THE DRAWINGS

The way in which the invention is implemented and its resulting advantages will be made more readily understandable by the descriptions of the following embodiments, given merely by way of example, reference being made to the accompanying drawings.

DESCRIPTION OF THE PREFERRED EMBODIMENTS

The following description is more particularly geared towards nuclear reactors. It must nevertheless be clearly understood that this application is in no way limitative and that other applications can be envisaged for the present invention, the compensating device in question being capable of being used with any lifting or handling system.

Figure 1:
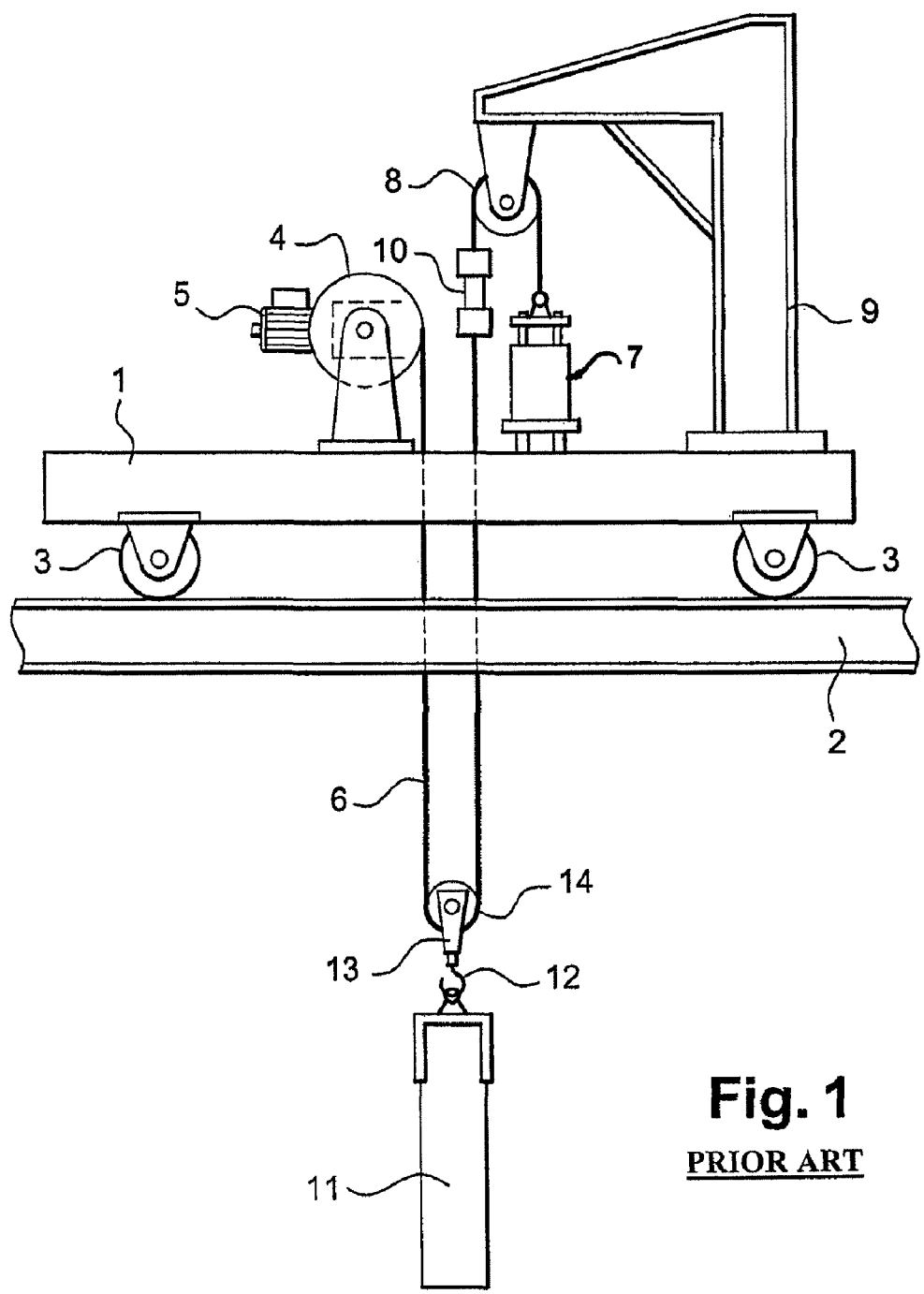
FIG. 1 is a schematic view of a device according to the prior state of the art.

FIG. 1 shows the trolley (1) of a refuelling machine for loading nuclear fuel assemblies into the reactor of a nuclear power station. This trolley (1) moves on a track (2) by means of rollers (3). This trolley comprises a lifting appliance consisting, in this case, of a winch (4) powered by a motor (5), one or more ropes (6) being wound around the winch. The other end of rope (6) is attached to a load compensating device (7) which is also connected to trolley (1).

In this case rope (6) wraps round a loose pulley (8) rotatably mounted on an arm connected to trolley (1).

This rope cooperates with a load cell (10) of the dynamometer strain gauge type and is connected to a weight indicator, information relating to the weight being transmitted to a programmable logic controller (not shown) that controls the refuelling machine.

The load (11), in this case a nuclear fuel assembly, is fastened to a hook (12) of a travelling block (13), with rope or ropes (6) wrapping round pulley (14) before it or they wrap round the drum of winch (4).

Figure 2:
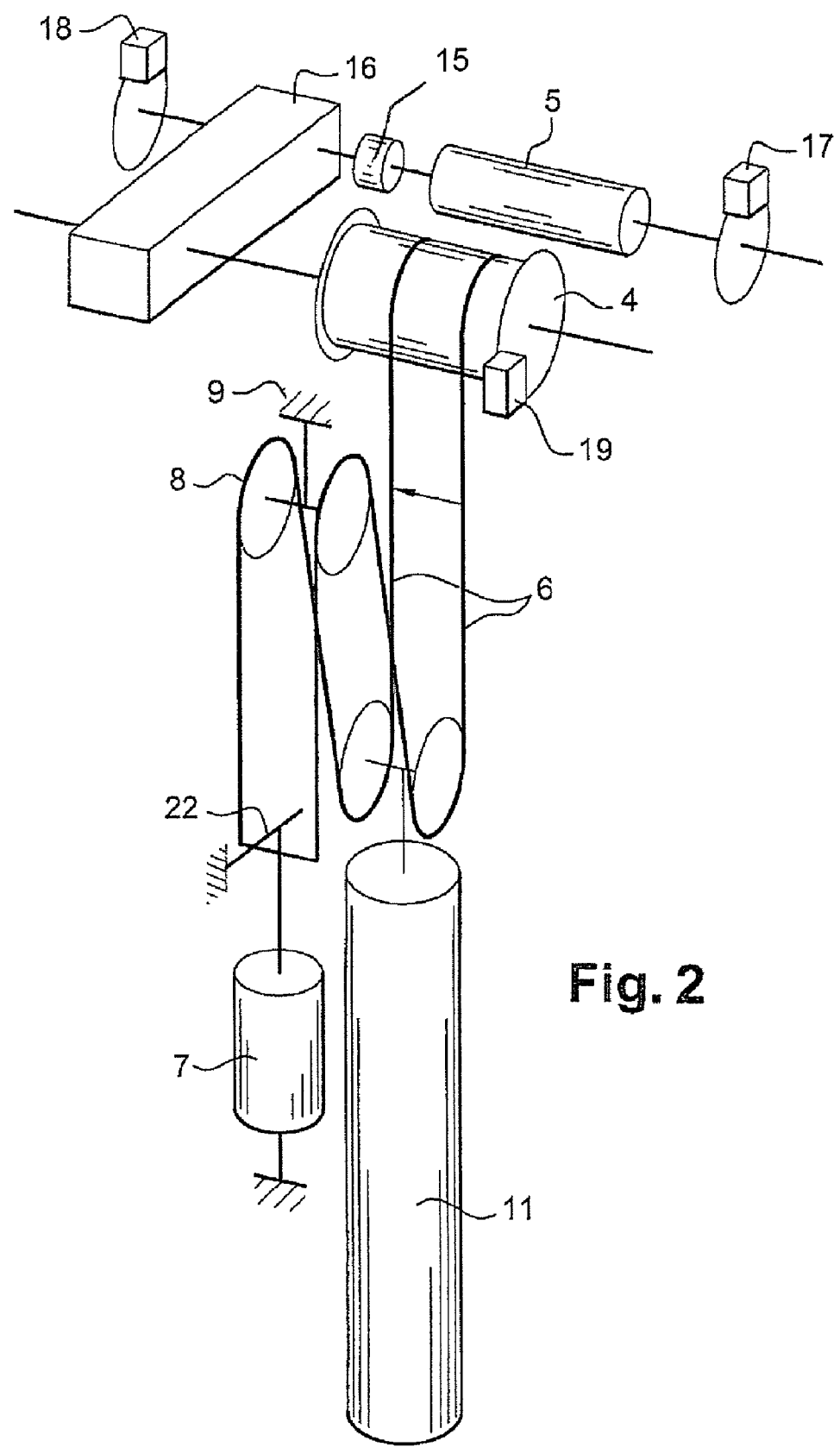
FIG. 2 is a schematic view of the kinematic linkage of the device according to the invention.

FIG. 2 shows the kinematic linkage used in greater detail.

Thus, besides the various components described in relation to FIG. 1 showing the prior state of the art, note that, in fact, motor (5) which ensures rotation of the drum around which rope or ropes (6) is/are wound is coupled to the drum via a coupler (15) which is itself coupled to reducing gear (16).

Moreover, this winch comprises, for instance, a triple braking system consisting of an operational brake (17) that acts directly on the motor shaft of motor (5), auxiliary brake (18) that also acts on the shaft of motor (5) and a safety braking system (19) that acts directly on the drum.

According to the invention, the load compensator consists of a linear actuator which is itself actuated by a brushless electric motor.

Figure 3:
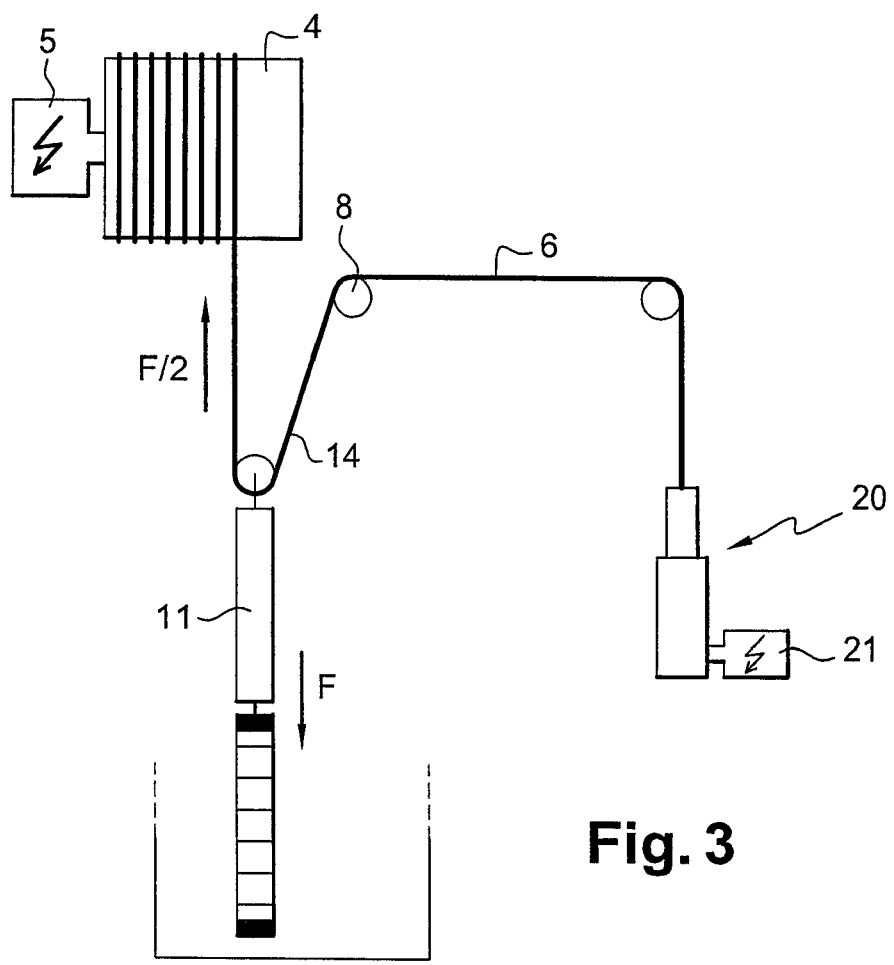
FIGS. 3, 3a and 3b are schematic views of the compensator in a first embodiment of the invention, FIG. 3a showing the compensator with overloading and FIG. 3b showing it with underloading.

Thus, in a first embodiment shown in the various FIGS. 3, this compensator comprises an electric jack (20), the brushless motor (21) of which actuates a ball screw spindle (not shown) attached to the rope(s) by a mechanical joint.

Figure 3A:
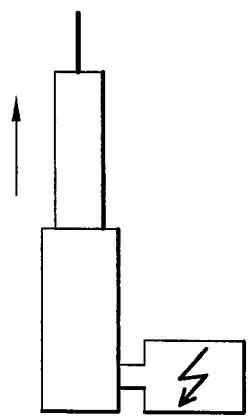
Figure 3B:
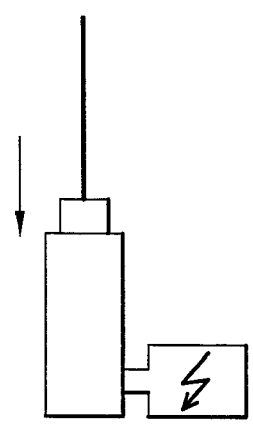

The travel of the compensator compared with its equilibrium position, shown in FIG. 3, is plus or minus 50 mm respectively in the example described, depending whether it is actuated due to overloading (FIG. 3a) or underloading (FIG. 3b). In other words, the total travel of the compensator is 100 mm in the example described.

In this same example and as can be seen, the rope or ropes (6) are attached to the free end of the compensator either directly or indirectly by means of a load balancing system (22) shown in FIG. 2.

The brushless motor is connected to a means of detecting faults. More specifically, the actual motor is controlled by an infinitely variable-speed transmission which itself receives control signals from the means of detecting faults. This means of detection either consists of a load cell of the type mentioned in relation to the prior state of the art or any type of load cell for measuring weight and especially the tension in the rope. This sensor may also consist of a sensor for measuring tensile, compression or other forces.

Obviously, this detector is also connected to motor (5) which ensures rotation of drum (4) so that when the tension exceeds a determined threshold (defined in greater detail later on) or, on the other hand, low tension is detected, this detection simultaneously causes stopping of drum (4) and actuation of the compensator (20) and (21) according to the invention. Consequently, the infinitely variable-speed transmission of the brushless motor of the compensator is itself connected to the winch control monitoring system.

In this first embodiment, one can use an electric servo press, of the type marketed by the firm PROMESS for example, as an electric jack. This may have an integral force sensor, thus making it possible to obtain redundant detection by adding it to the load cell associated with the rope.

Figure 4:
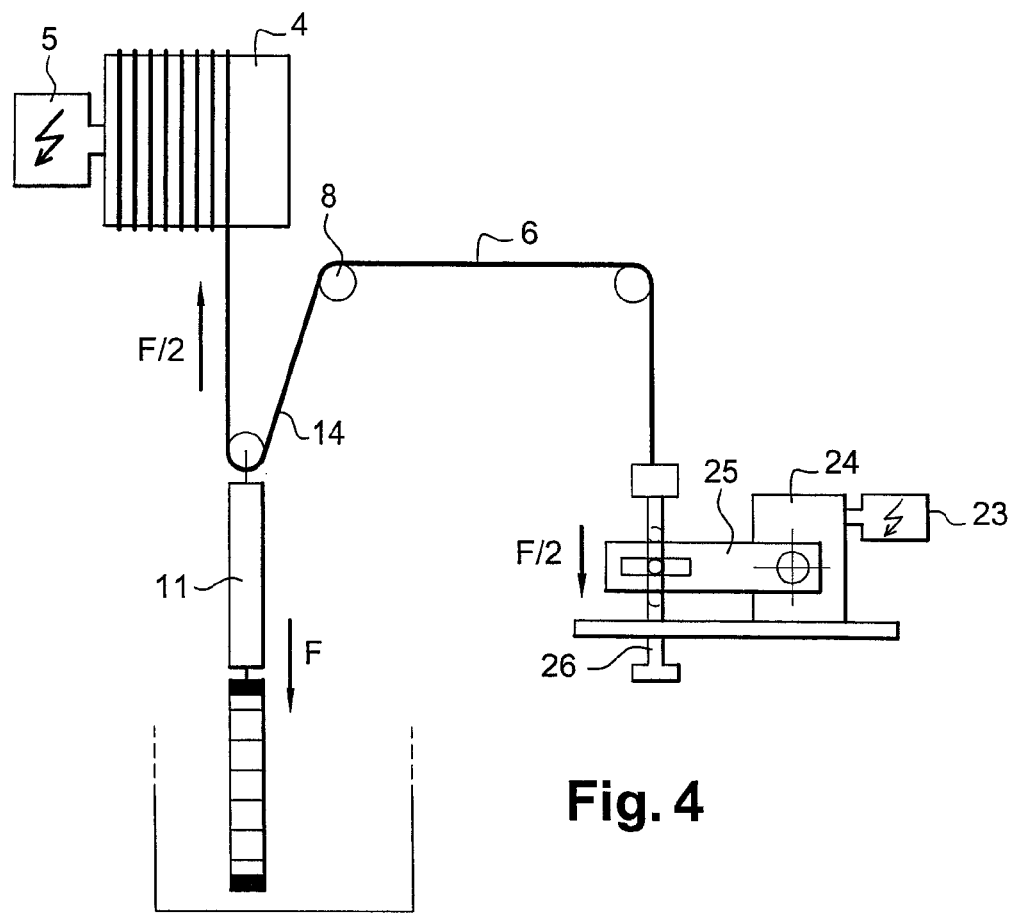
FIGS. 4, 4a and 4b are schematic views of the compensator in a second embodiment of the invention, FIG. 4a showing the compensator with overloading and FIG. 4b showing it with underloading.
Figure 4A:
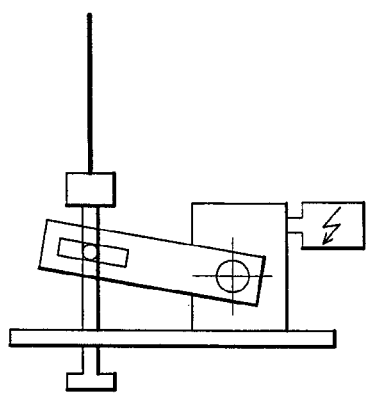
Figure 4B:
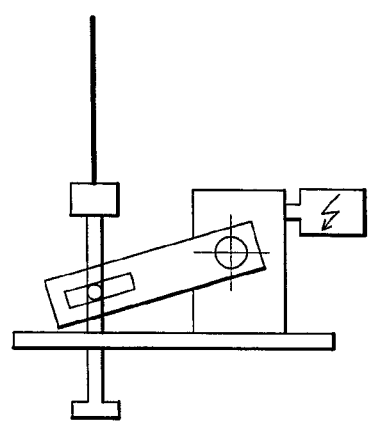

In another embodiment of the invention shown in FIGS. 4, 4a and 4b, the principle of the invention remains the same, namely using a brushless motor, here consisting of a torque motor (23) which actuates reducing gear (24) which in turn causes rotation of a connecting rod (25), the free end of which cooperates with bar (26). The rope or ropes (6) are joined to the free end of this bar so as to convert the rotational movement of the connecting rod into translational movement, still with the intention of ensuring compensation.

In addition and advantageously, the compensator according to the invention is equipped with a safety device of the failsafe motor brake type which acts directly on the brushless motor.

The parameters for such a brushless motor can be assigned by means of an infinitely variable-speed transmission. This being so, it is possible to define a certain number of thresholds in respect of detection and, consequently, in respect of actuating the load compensator according to the invention.

In the application which is more specific to the field of lifting machinery for nuclear reactors, the load compensator has three different functions.

Firstly, a counterweight function which is made possible by using the brushless motor. This function is used when moving the gripper located at the end of rope or ropes (6) closer to the fuel assembly or when placing the fuel assembly on the core plate so as to limit the force applied to the tip of the fuel assembly to a maximum load, thereby preventing damage to the assembly in question.

The compensator also has a compensation function in the upper area, i.e. in the area near the location where the upper end of the fuel assemblies is positioned when they are in place in the reactor core and an approach area equivalent to the lower area of the location where the assemblies are normally positioned level with the core plate, once again in order to limit the forces caused by interaction and obstruction between the top and the base of the fuel assembly.

Finally, the compensator has a compensation function in the middle area, i.e. the area which separates the previous two areas in order to limit the forces caused by interaction between the spacer grids of the various fuel assemblies.

By using various programs to operate the infinitely variable-speed transmission of the brushless motor of the compensator, one can vary the different thresholds for triggering actuation of said compensator in relation to the heights of different lifting sequences.

Thus, when an overload is detected, in principle during upward movement of the ropes and hence the fuel assembly, the compensator will cause displacement equivalent to the length of rope wrapped round drum (4) during the time when the latter is stationary. In other words, the compensator will release rope.

Analogously and in the event of an underload, especially during downward movement of the fuel assembly, the compensator will take up the length of rope paid out by the winch during the time when the latter is stationary.

Two types of control are used in order to achieve this result, firstly force control.

The compensator is designed to control the forces applied to the load, in this case a fuel assembly, during both upward and downward movement.

In fact, as long as the force and therefore the load or tension of the rope remains within a precise envelope, the compensator remains in its balanced position and continues to monitor the situation.

As soon as the force exceeds the envelope, i.e. if a fault (overload or underload) is detected, force control comes into play. Consequently, as soon as a fault is detected, the command to stop the lifting or downward movement is sent to the winch. During downward no-load movement of the winch, i.e. in the absence of a load, only the counterweight function is operative because one has just moved the lifting accessories (mast, gripper and special tool if applicable) closer to the fuel assembly.

In this configuration, the force sensed by the compensator is equivalent to a determined set point defined as representing half the weight of the lifting accessories.

This force varies because the number of lifting and handling accessories is not constant and it can assume different thresholds depending on the number of tools that are intended to be supported besides the nature or the origin of the fuel assemblies. In fact, it should be noted that fuel assemblies are not all made by the same manufacturer and that their mass is therefore not constant.

These thresholds are set again as needed by entering parameters in the control system of the brushless motor. There is therefore a corresponding control program for every type of load configuration. These programs are stored in the memory associated with the infinitely variable-speed transmission of the compensator and invoked by the programmable logic controller of the refuelling machine which knows the relevant load configuration.

During upward movement of the winch with a fuel assembly, in the approach area, the counterweight function is always activated and meets the same requirements in terms of force as described above.

Once loading has been completed, i.e. fuel assembly+any tool is tensioned on the ropes, the compensation function in the upper area and approach area is activated. In this configuration, the force sensed by the compensator is equivalent to the set point defined as representing half the weight of the lifting accessories and half the weight of the fuel assembly.

Here too, depending on the type of fuel used, which is not necessarily uniform, the force may assume several values and the corresponding thresholds can be set thanks to the infinitely variable-speed transmission associated with the brushless motor of the compensator.

In contrast, in the intermediate area, the counterweight function is replaced exclusively by the compensation function with the threshold for triggering the compensator being equivalent to the set point indicated previously.

In the context of downward movement of the winch supporting a fuel assembly, the functions of the compensator compared with those described earlier are simply reversed compared with upward movement and operation remains identical.

Positional control can then be carried out. As soon as a fault is detected and as already stated, the command to stop lifting or downward movement is sent to the winch and the command to compensate take-up or payout of the rope or ropes is sent to the compensator. This type of control is performed using information obtained from an absolute encoder which describes changes in the position of drum (4) of the winch and which therefore correlates directly to the quantity of rope that is taken up or paid out.

As mentioned previously, the quantity of rope that is wound or unwound by drum (4) is released or taken up respectively by the compensator.

Figure 5:
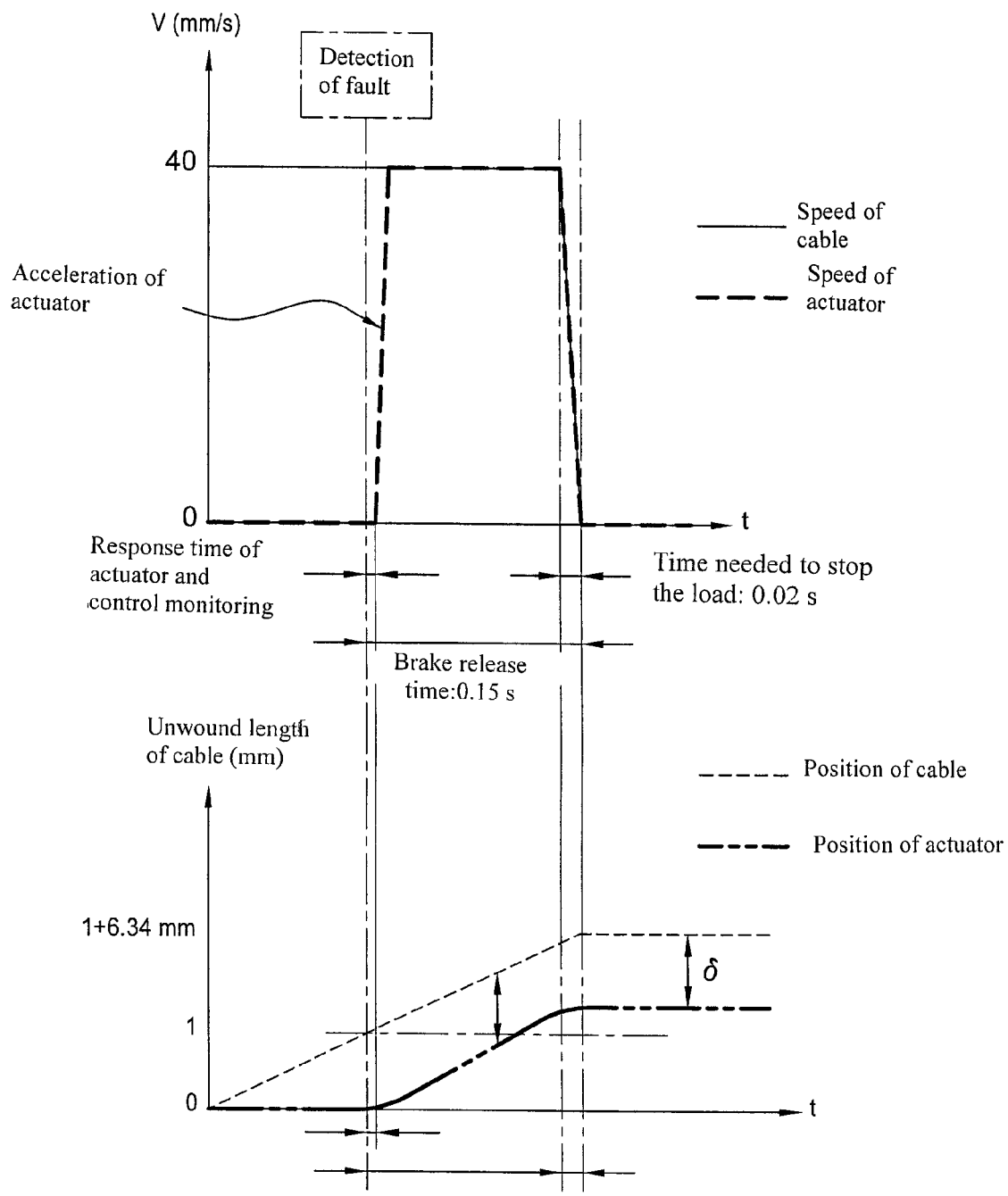
FIG. 5 is a double graph showing changes in the speed and position of the compensator as a function of the time after detecting a fault.

The two graphs in FIG. 5 respectively show the variation in compensation speed as a function of time and the length of rope that is unwound, also as a function of time.

In the first graph one can see that when a fault is detected, the actuator that is part of the compensator is subjected to immediate acceleration in order to cause its displacement ($2^{nd}$ graph) until the effective braking time of the drum of the winch is reached.

This compensator is controlled via a PC or any other equivalent system.

It is evident that using such a load compensating device makes it possible to significantly improve the operating conditions of a lifting appliance.

In fact, load lifting speeds can be increased significantly.

Loads can also be much heavier than those that can be handled using the device according to the prior art described above, where one soon comes up against its load limit of the order of 1.5 tonnes.

In addition, using a brushless motor associated with an infinitely variable-speed transmission creates the possibility of installing various types of winches and hence assigning different set points to the compensator, depending on the operational configuration of the lifting appliance.

Significantly increasing load lifting speeds consequently reduces the time for which units of power stations have to be shut down in order to perform maintenance, especially rearrangement of the reactor core, hence improving the profitability of these power stations.

Finally, thanks to its very operating principle, the compensator according to the invention can be used limitatively only with its counterweight function. To achieve this, the infinitely variable-speed transmission of the brushless motor receives a particular set point in relation to the force threshold assigned to it. In this case, the so-called "counterweight" threshold(s) is/are activated over a specific lifting travel in order to limit the force applied, especially to the top of the fuel assembly, to a maximum load, thereby avoiding damage to the fuel assembly. In addition, sensor or sensors (10) are disabled.

The invention claimed is:

1. A load compensating device for use with means for detecting an overload or an underload, the load compensating device comprising an actuator having a translational component attached to one end of a rope or ropes supporting a load for producing positive or negative displacement of said rope or ropes over a short distance compared with a length of the rope or ropes and operated by a brushless electric motor having an infinitely variable-speed transmission which transmission is connected to the means for detecting an overload or underload.

2. A load compensating device as claimed in claim 1, wherein the actuator is linear and comprises an electric ball screw jack actuated by the brushless motor.

3. A load compensating device as claimed in claim 1, wherein the actuator comprises a rotating element of torque motor type, said motor driving, via a reducing gear, a connecting rod, said connecting rod displacing a linear bar having a free end attached to the rope or ropes.

4. A load compensating device as claimed in claim 1, wherein the device only operates in counterweight mode, the infinitely variable-speed transmission of the brushless motor receiving a particular set point in relation to an assigned force threshold and the means for detecting an overload or underload being disabled.

5. A refueling machine for a nuclear power station comprising a trolley capable of moving on a track located above a reactor core and comprising a lifting appliance including a winch driven by a motor around which one or more hoisting ropes are wound and wherein an end or ends of the one or more hoisting ropes is/are attached to the load compensating device according to claim 1.

* * * * *